(12) United States Patent
Cabanus et al.

(10) Patent No.: US 12,358,413 B2
(45) Date of Patent: Jul. 15, 2025

(54) DUAL ACTING CARGO VAN DOOR AND RAMP SYSTEM

(71) Applicant: Multimatic Inc., Markham (CA)

(72) Inventors: Christopher Lee Cabanus, Mississauga (CA); Michael Gordon Lehti, Ashburn (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 18/578,693

(22) PCT Filed: Jul. 12, 2022

(86) PCT No.: PCT/CA2022/051081
§ 371 (c)(1),
(2) Date: Jan. 11, 2024

(87) PCT Pub. No.: WO2023/283729
PCT Pub. Date: Jan. 19, 2023

(65) Prior Publication Data
US 2024/0262275 A1    Aug. 8, 2024

Related U.S. Application Data

(60) Provisional application No. 63/220,831, filed on Jul. 12, 2021.

(51) Int. Cl.
*B60P 1/43*      (2006.01)
*B60J 5/10*      (2006.01)
*B61D 47/00*    (2006.01)

(52) U.S. Cl.
CPC ............... *B60P 1/435* (2013.01); *B60J 5/108* (2013.01); *B61D 47/00* (2013.01)

(58) Field of Classification Search
CPC .......... B60J 5/108; B60P 1/435; B61D 47/00
See application file for complete search history.

(56) References Cited

U.S. PATENT DOCUMENTS

| 4,950,124 A | 8/1990 | Burghart et al. |
| 5,769,593 A | 6/1998 | Buffaloe |

(Continued)

FOREIGN PATENT DOCUMENTS

| CA | 2466619 A1 | * | 11/2005 | ............ B60P 1/435 |
| CN | 107310354 A | * | 11/2017 | ............ B60P 1/435 |

(Continued)

OTHER PUBLICATIONS

International Search Report and Written Opinion for International Application No. PCT/CA2022/051081, date of mailing Aug. 11, 2023.

*Primary Examiner* — James Keenan
(74) *Attorney, Agent, or Firm* — Borden Ladner Gervais LLP; Brandon L. Evenson

(57) ABSTRACT

A cargo van door system comprises a cargo van with a cargo compartment, first pivoting means to permit one or more doors releasably to pivot laterally and perpendicularly in relation to one of three outward facing side walls of the cargo compartment to act as a door, second pivoting means to permit the door releasably to pivot perpendicularly in relation to a floor of the cargo compartment to act as a ramp, and means to coordinate engagement and disengagement of the first pivoting means and the second pivoting means. When the first pivoting means is engaged to permit the door to swing laterally and perpendicularly in relation to one of the outward facing side walls to continue to function as a door, the second pivoting means is disengaged, and when the second pivoting means is engaged to permit the door to swing perpendicularly in relation to the floor to act as a ramp, the first pivoting means is disengaged.

14 Claims, 10 Drawing Sheets

(56) References Cited

U.S. PATENT DOCUMENTS

| | | | |
|---|---|---|---|
| 6,068,324 A | 5/2000 | DeKlotz | |
| 7,111,908 B1 * | 9/2006 | Mills | B60P 1/00 |
| | | | 298/22 J |
| 7,380,873 B2 * | 6/2008 | Shoemaker | B60J 5/108 |
| | | | 296/61 |
| 8,500,184 B2 * | 8/2013 | Fraley | B62D 33/0273 |
| | | | 296/50 |
| 10,124,845 B1 | 11/2018 | Boltz | |
| 2006/0220410 A1 | 10/2006 | Luehr et al. | |
| 2007/0262601 A1 | 11/2007 | Shoemaker | |
| 2020/0123829 A1 | 4/2020 | Ehrgott | |

FOREIGN PATENT DOCUMENTS

| | | | | |
|---|---|---|---|---|
| DE | 102013018559 A1 * | 7/2014 | | B60J 5/108 |
| EP | 1800945 A2 | 6/2007 | | |
| FR | 2916701 A3 | 12/2008 | | |
| GB | 2401394 A * | 11/2004 | | B60P 1/435 |
| WO | WO-0227129 A1 * | 4/2002 | | B60J 5/108 |

* cited by examiner

DUAL ACTING CARGO VAN DOOR AND RAMP SYSTEM

FIELD OF THE INVENTION

This invention is in the field of automotive doors and ramps, and in particular, cargo van doors and ramps.

BACKGROUND

Cargo vans with cargo compartments are useful for transportation of small to moderate sized loads. Loads may vary from packages small enough to be held in the hands to larger packed items, furniture, building materials and a myriad of other cargo. Typically, cargo vans have a single rear door which swings open sideways, or two doors latched center-line of the vehicle which swing open sideways in opposite directions. Such a door or doors may alternatively be located on a side of the cargo compartment. When a single person unloads cargo, the person may move the cargo to be delivered to a position in the cargo compartment adjacent the door or doors. Then the person must hop or step down to ground level from the floor of the cargo compartment to lift the cargo out of the cargo compartment to be transported by hand or on a cart, trolley or other transporting means. This jump down to ground level may be difficult for some persons, although a step to assist entry and exit from the cargo compartment may be provided. Having two persons participate in the unloading allows one of them to stay in the cargo compartment while the other stands at ground level to receive the unloaded cargo.

Sometimes, cargo loads are too large or heavy for this simple unloading process and it is advantageous to employ some kind of ramp to facilitate removal of the cargo from the van. One or more persons may walk down the ramp holding cargo, may guide a trolley or cart loaded with cargo down the ramp, or may push cargo down the ramp to slide it to ground level. Sometimes a ramp is also helpful when the cargo is to be unloaded above ground level either below or above the level of the cargo compartment floor. Clearly, many of the same factors present during unloading also apply when loading cargo into a van. Typically, ramps are stored beneath the cargo compartment floor and pulled out to the rear of the van. Some ramps may be flush with the cargo compartment floor when deployed. Other ramps may be mounted so that they do not present a continuous surface from the cargo compartment floor, thus presenting a drop from the cargo compartment floor to the ramp deployed some distance lower.

Typically, ramps mounted below the floor of the cargo compartment are pulled from their stowed position manually, although sometimes this ramp deployment is motorized. The weight of such pull-out ramps may present difficulties to some users who lack sufficient strength or who otherwise struggle to deploy the ramp manually. Also, when the ramp and its carriage become worn with use, there may be misalignment issues or increased friction and resistance to deployment of the ramp. Again, many of the factors which apply during deployment of the ramp will also apply when the ramp is stowed after use.

Accordingly, since both side swinging van doors and deployable ramps are useful in certain circumstances in cargo vans, it would be beneficial to provide both functions in a simplified construction, preferably with fewer individual components. It would also be beneficial to reduce the weight issues, frictional resistance and wear of components implicated in the conventional deployment of ramps.

SUMMARY OF THE INVENTION

A new means of combining the functions of the door and ramp in a cargo van door has been developed. The door and ramp comprise a single component. Using releasable pivoting means located generally orthogonally to each other, the door can be swung open sideways using first pivoting means mounted adjacent a side wall of the cargo compartment to allow rampless loading or unloading of cargo or, alternatively, swung down on a second pivoting means mounted adjacent the cargo compartment floor to form a ramp. Generally, both releasable pivoting means may be latched when the door and ramp is fully closed. The releasable pivoting means may comprise a hinge or hinges.

Typically, vans are provided with a pillar or pillars at the rear of the cargo compartment for structural support. These pillars may comprise the border of an opening in an outward facing side wall of the cargo compartment in which a door or doors are mounted. A side latchable hinge may be mounted to a single support pillar or side latchable hinges may be mounted to spaced apart support pillars. When either the door is to be opened or the ramp is to be deployed, one of the releasable hinges is latched or engaged, while the other releasable hinge is unlatched or disengaged in order to permit this dual door and ramp function. The motion of the ramp, which rotates on the second hinge vertically in relation to the van, may be controlled by a coil spring, a strut assist mechanism, an electric motor, or by other suitable control means. A cable or other suitable connecting means between the ramp and the control means allows the ramp to open and close smoothly and under control. A single door and ramp unit, or two door and ramp units mounted side by side, may be employed. Also, multiple first hinges and second hinges may be employed, if required. One or more conventional latches may be used to releasably hold a single door to a van side wall or to releasably hold two side by side doors together when the doors are closed. In the latter case, two doors are mounted side by side and releasably latched at a center-line of the cargo compartment opening. There are three outward facing side walls. The door or doors may be mounted in the rear facing side wall, or in one or both of the lateral side walls of the van, or in any combination thereof.

In a principal aspect of the invention, a cargo van door system comprises a cargo van with a cargo compartment comprising a roof, a floor and three outward facing side walls, at least one door mounted in an opening in at least one of the outward facing side walls comprising an exterior facing side and an interior facing side, a first lateral side and a second lateral side, and an upward facing side and a downward facing side, all defined directionally when the at least one door is closed, first pivoting means to permit the at least one door releasably to pivot laterally and perpendicularly in relation to one of the outward facing side walls to act as a door, second pivoting means to permit the at least one door releasably to pivot perpendicularly in relation to the floor to act as a ramp, means to coordinate engagement and disengagement of the first pivoting means and the second pivoting means, such that when the first pivoting means is engaged to permit the at least one door to swing laterally and perpendicularly in relation to one of the outward facing side walls of the cargo compartment to continue to function as a door, the second pivoting means is disengaged, and when the second pivoting means is engaged to permit the at least one door to swing perpendicularly in relation to the floor of the cargo compartment to act as a ramp, the first pivoting means is disengaged.

In a further aspect of the invention, when the second pivoting means is engaged so that the at least one door acts as a ramp, the motion of the ramp is controlled by one of a coil spring, a strut assist mechanism, an electric motor, or other suitable control means.

In a further aspect of the invention, a cable is connected between the outward lateral side of the at least one door and one of the coil spring, the strut assist mechanism, the electric motor, or other suitable control means.

In a further aspect of the invention, the first pivoting means comprises at least one first releasable hinge.

In a further aspect of the invention, two doors are mounted side by side in a frame which is releasably mounted to an outward facing side wall and rotationally mounted to the floor.

In a further aspect of the invention, the frame comprises two L-brackets releasably connected to each other adjacent the floor and centrally of the opening which, when connected, permit the doors either to rotate horizontally to act as doors or to open and close together to act as a ramp, and when disconnected, permit either door to rotate vertically to act as a ramp.

In a further aspect of the invention, multiple first releasable hinges are mounted between the frame and each of the doors.

In a further aspect of the invention, at least one first latch is adapted to release the at least one door to rotate open and closed to act as a ramp.

In a further aspect of the invention, at least one first releasable hinge is mounted between the first lateral side of the at least one door and adjacent one of the outward facing side walls of the cargo compartment.

In a further aspect of the invention, at least one second releasable hinge is mounted between the downward facing side of the at least one door and adjacent the floor of the cargo compartment.

In a further aspect of the invention, the at least one door further comprises a ramp flap hinged to the upward facing side of the at least one door which rests against the interior facing side of the at least one door when the at least one door is oriented vertically, and which rotates outwardly to provide an extension to the at least one door when the at least one door acts as a ramp.

In a further aspect of the invention, the at least one door is mounted in an outward facing side wall at a rear of the cargo compartment.

In a further aspect of the invention, the at least one door is mounted in an outward facing side wall at a side of the cargo compartment.

In a further aspect of the invention, a single door is releasably latched adjacent a side wall of the cargo compartment.

In a further aspect of the invention, two doors are mounted side by side and releasably latched at a center-line of the cargo compartment opening.

Further features and aspects of the invention will be apparent from the following description.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION OF THE INVENTION

Figure 1:
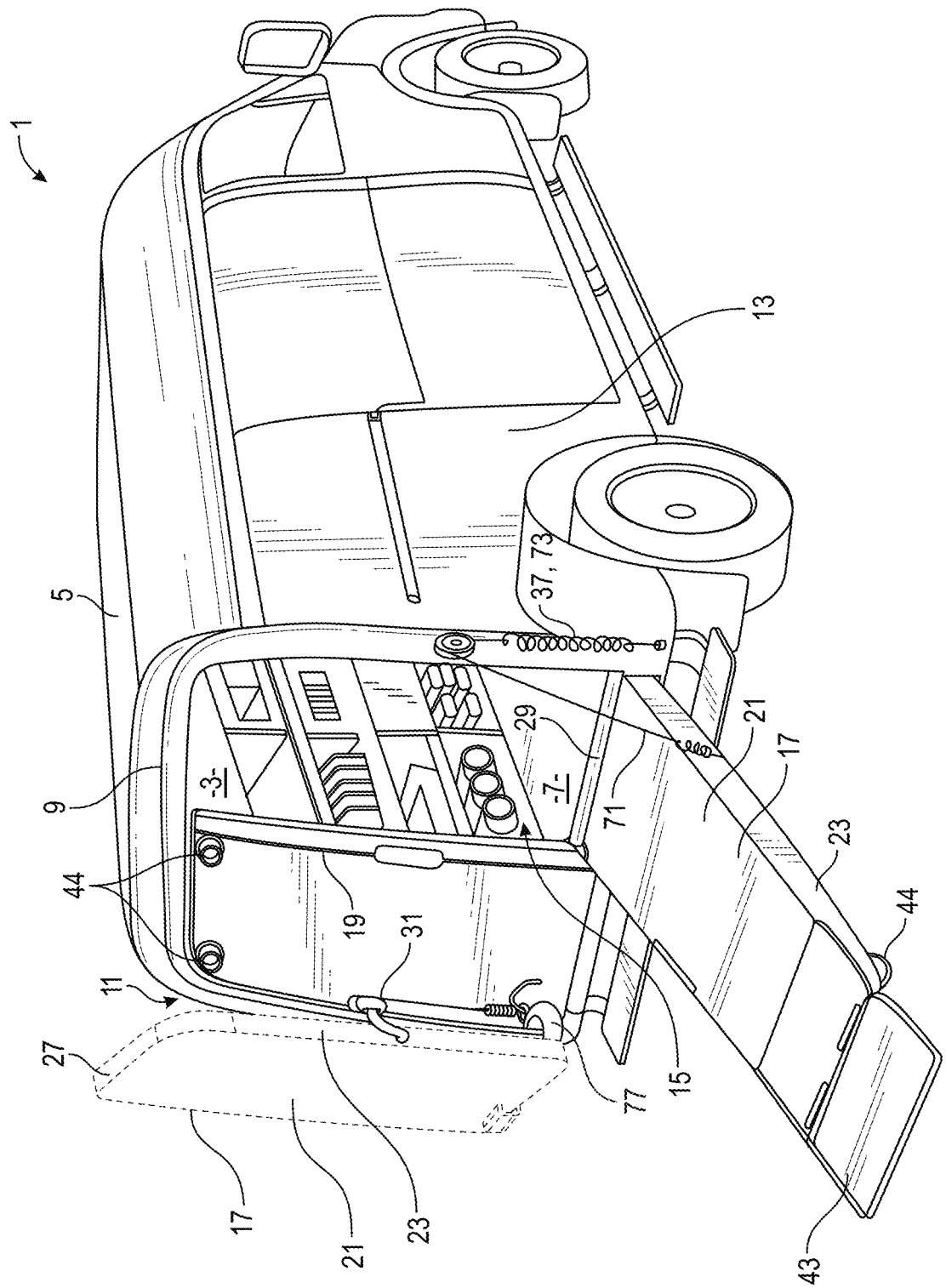
FIG. 1 is a perspective, representational view of a cargo van with a dual acting door and ramp system.
Figure 2:
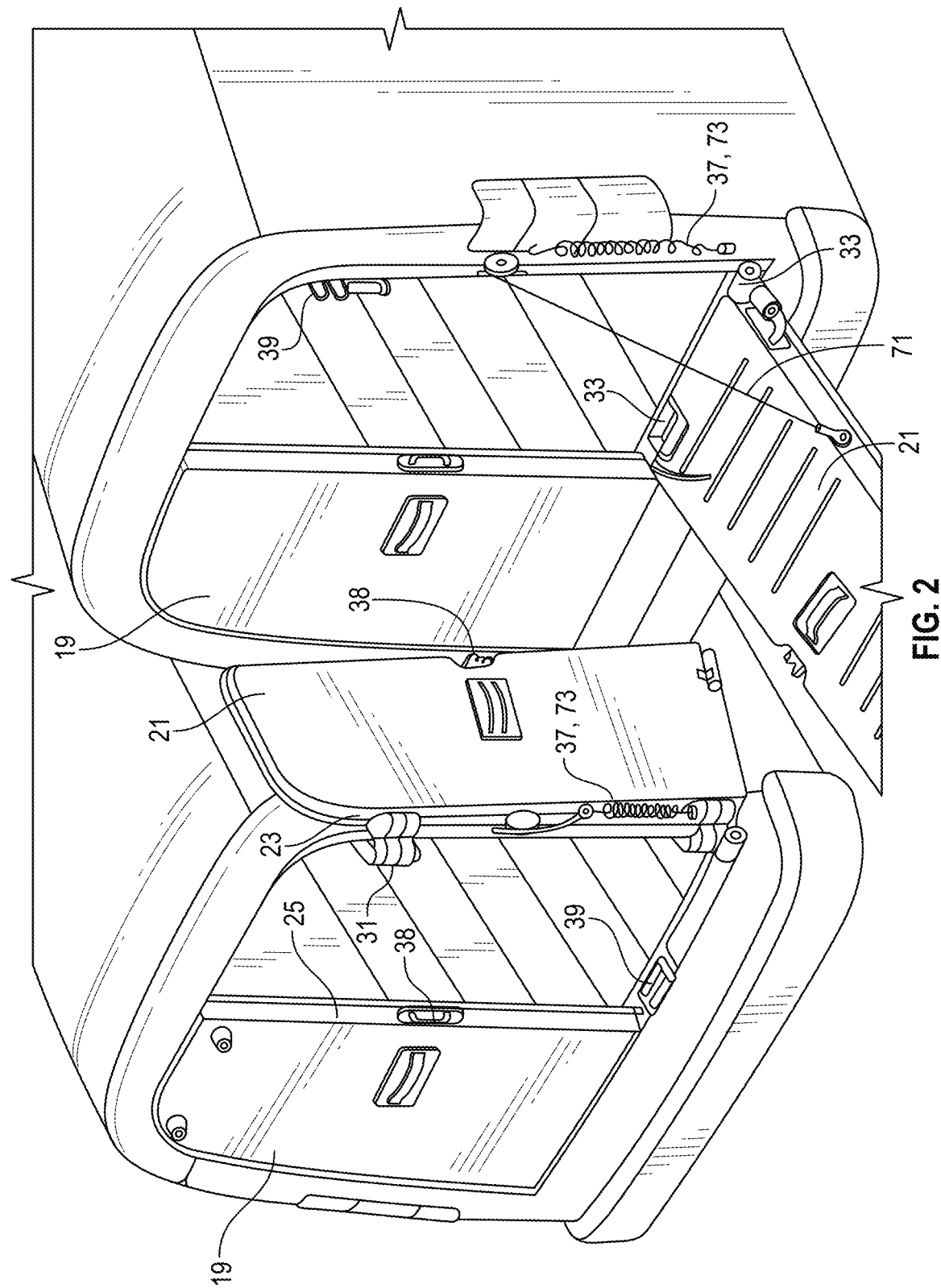
FIG. 2 is a perspective view of the rear of a cargo van with a dual acting door and ramp system.
Figure 3:
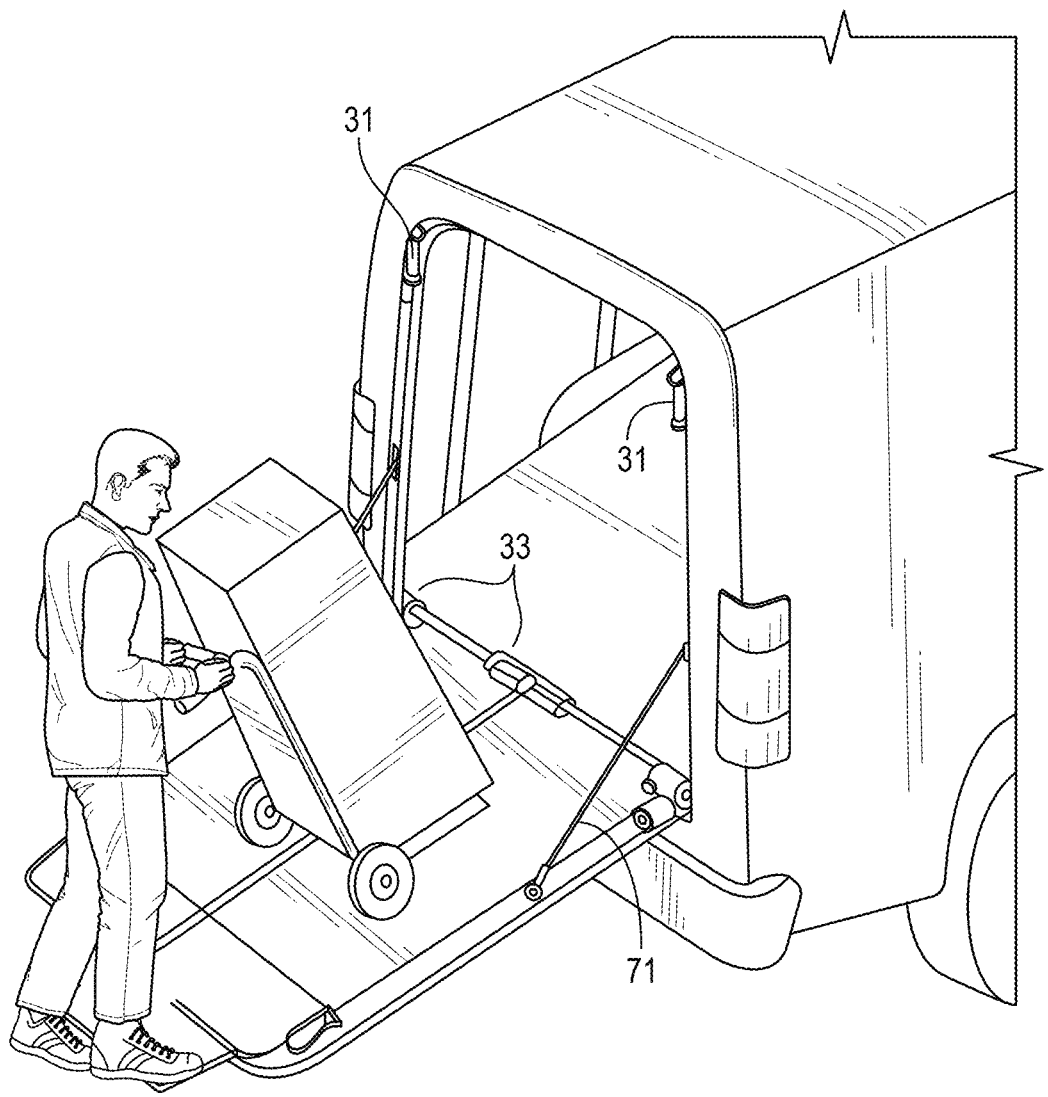
FIG. 3 is a perspective view of the rear of a cargo van showing two doors deployed as a ramp.
Figure 4:
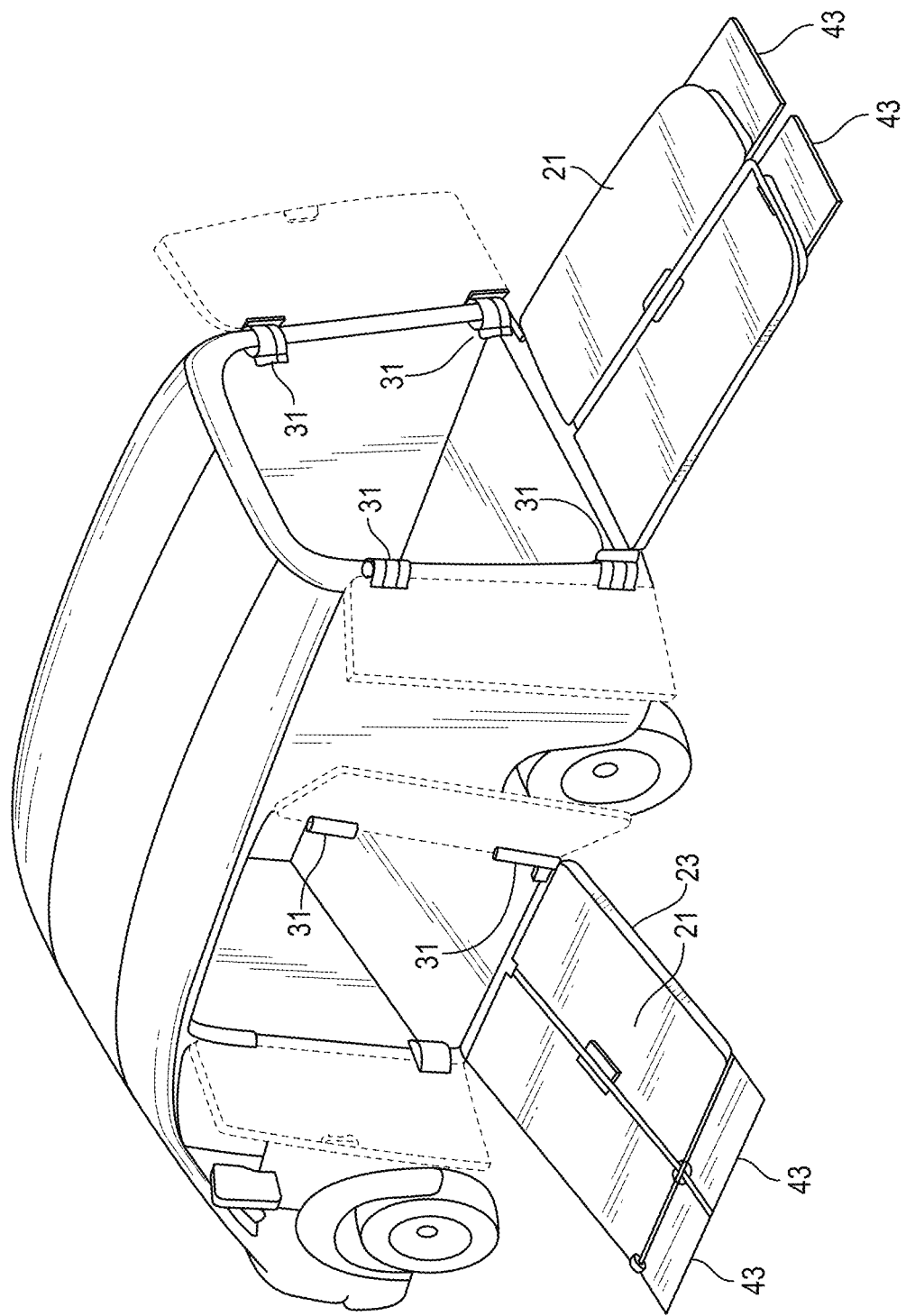
FIG. 4 is a perspective, representational view of a cargo van with multiple dual acting door and ramp systems.
Figure 5:
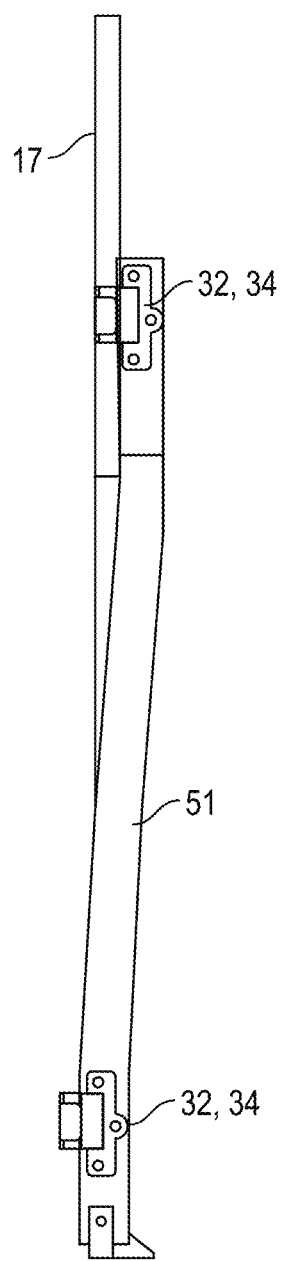
FIG. 5 is an elevational, side view of a frame and door for a dual acting door and ramp system.
Figure 6:
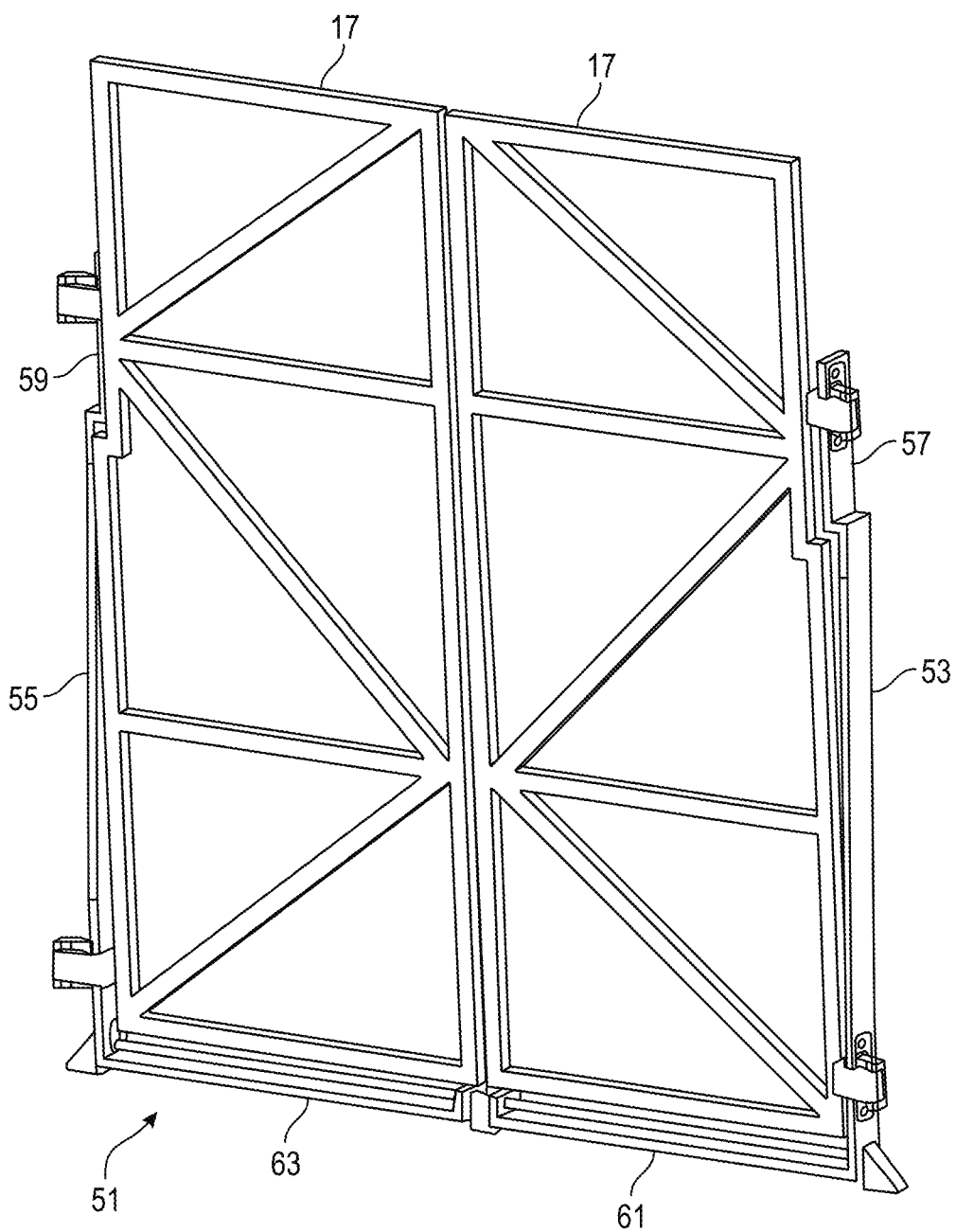
FIG. 6 is a perspective, representational view of a frame and doors for a dual acting door and ramp system with the doors closed.
Figure 7:
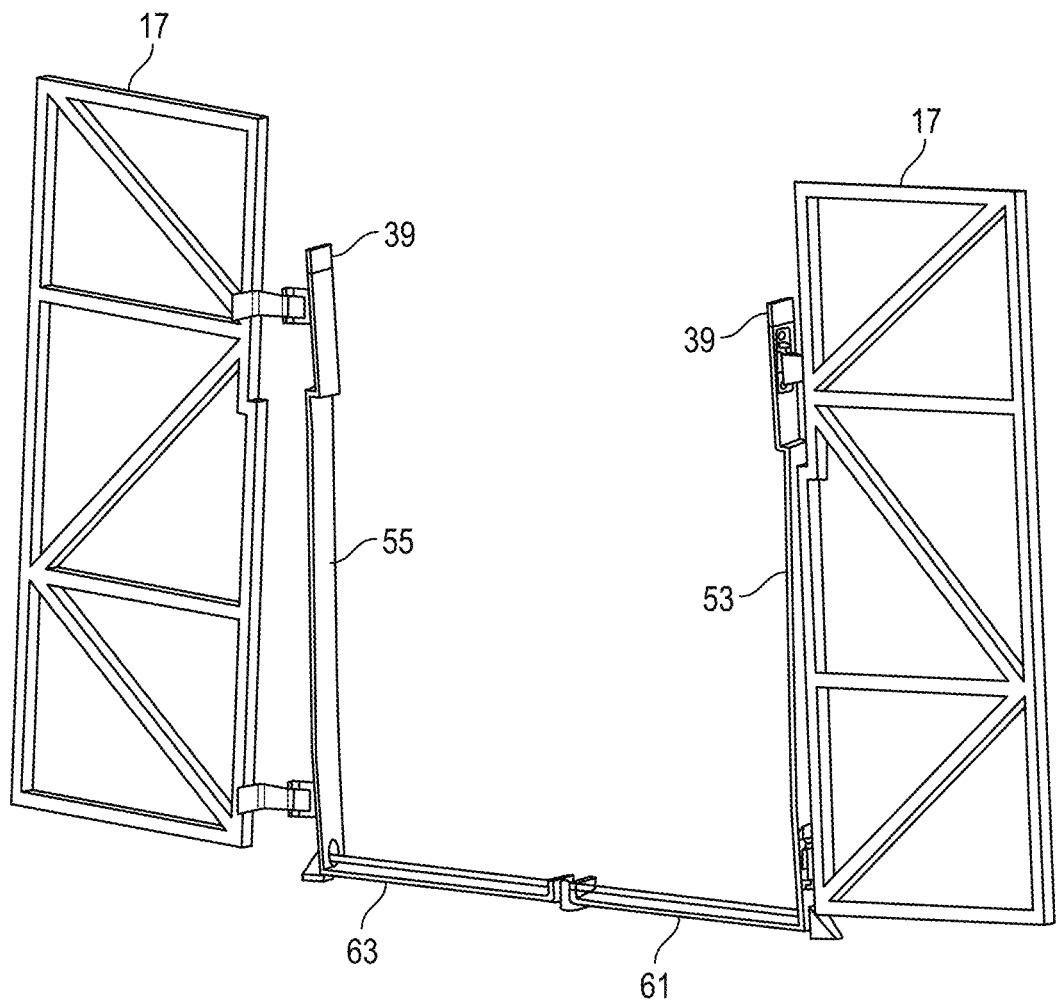
FIG. 7 is a perspective, representational view of a frame and doors for a dual acting door and ramp system with the doors opened to act as doors.
Figure 8:
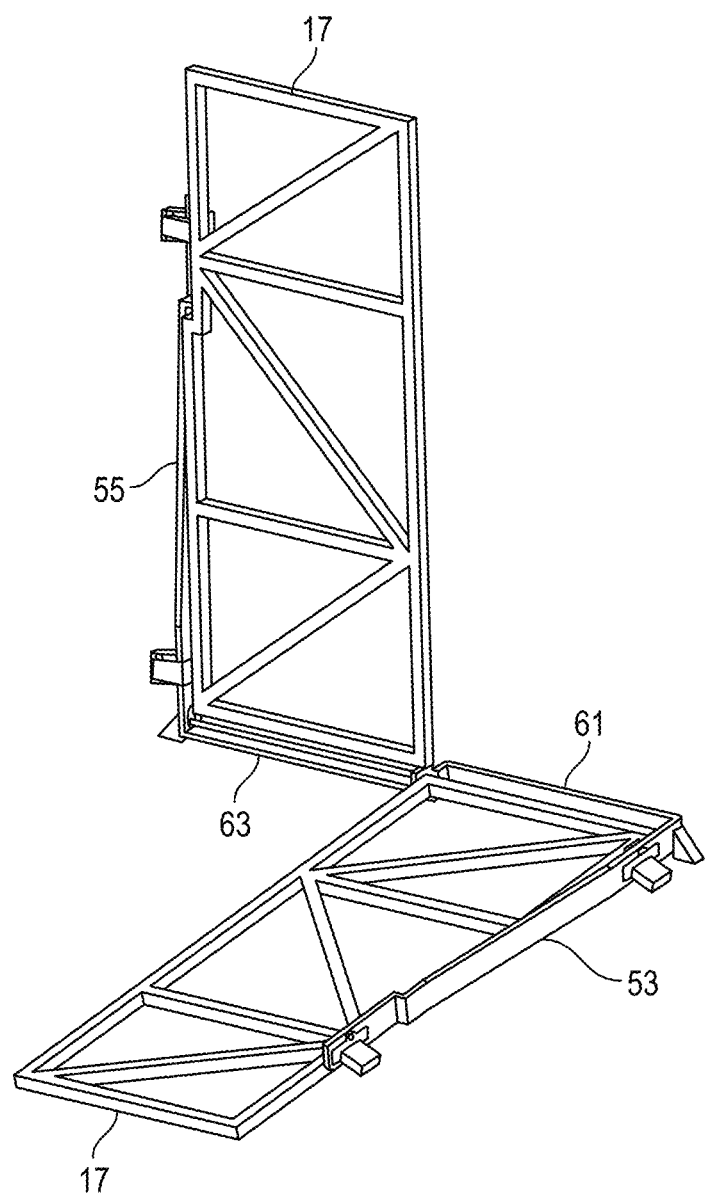
FIG. 8 is a perspective, representational view of a frame and doors for a dual acting door and ramp system with one door closed and one door opened to act as a ramp.
Figure 9:
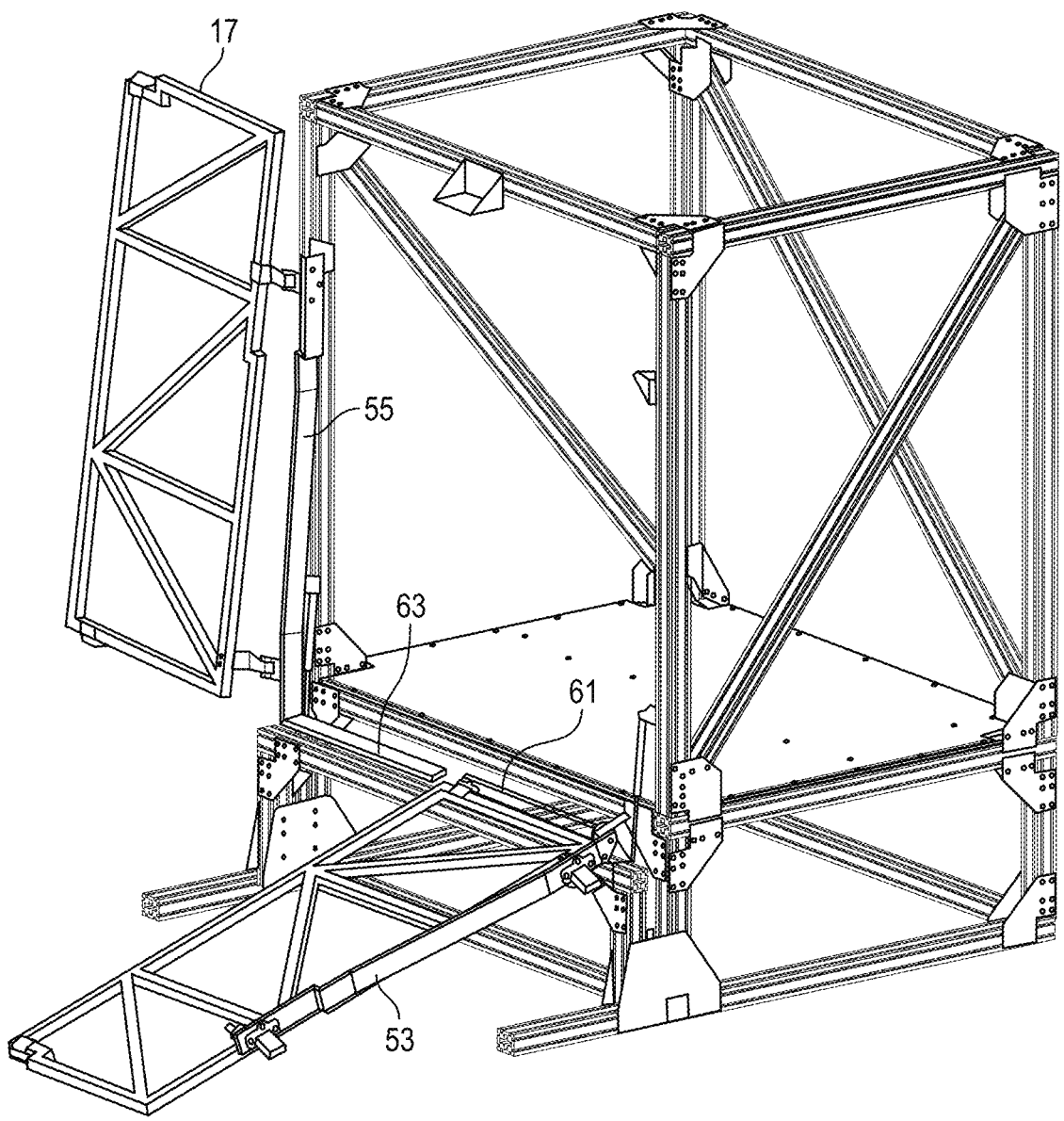
FIG. 9 is a perspective, representational view of a frame and doors for a dual acting door and ramp system mounted in an opening of a schematic cargo compartment with one door opened to act as a door and one door opened to act as a ramp.
Figure 10:
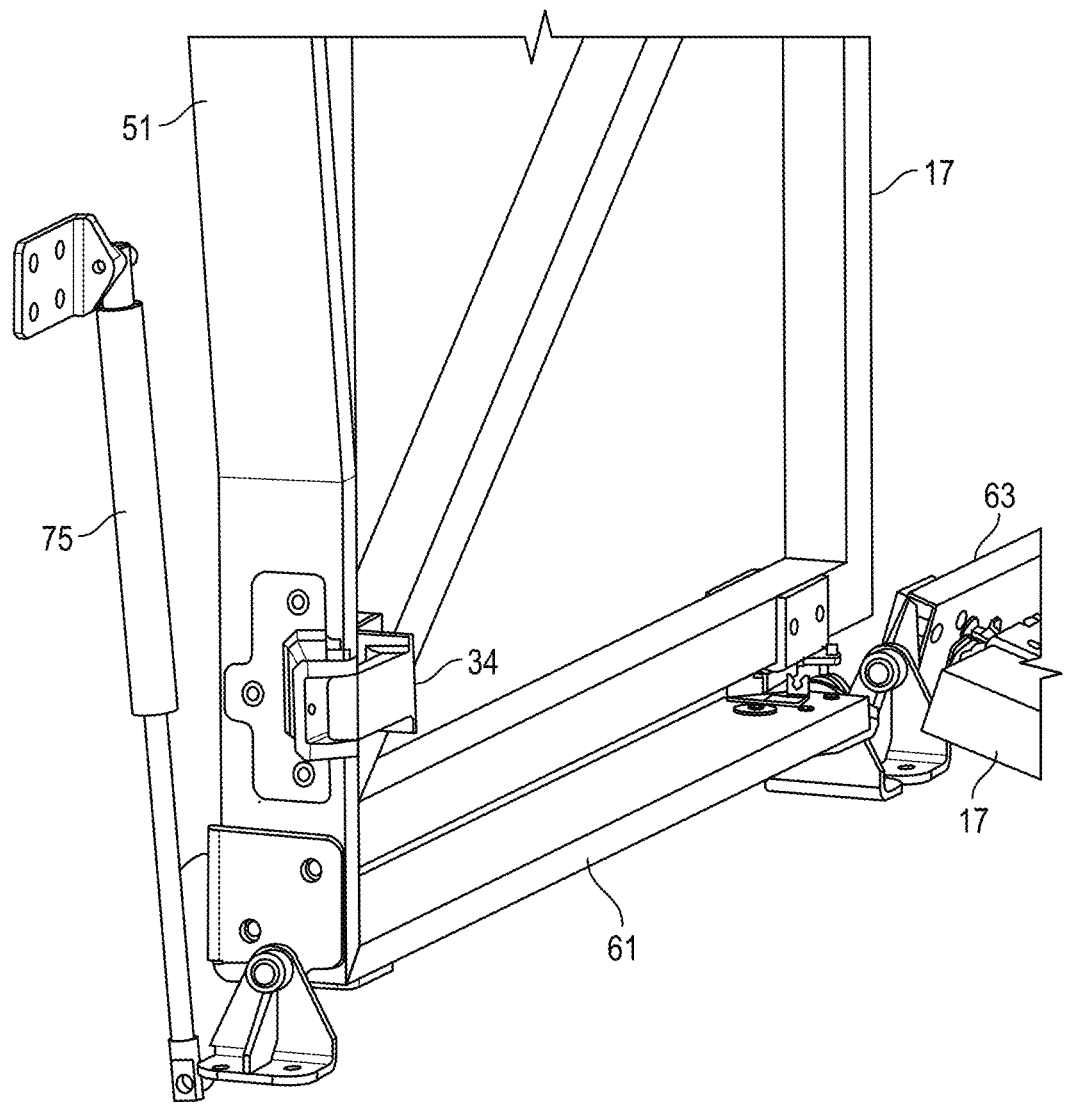
FIG. 10 is a perspective, representational, partial view of a frame and doors for a dual acting door and ramp system with one door closed and one door opened to act as a ramp.

FIG. 1 is representational, in part, since it illustrates a cargo van with one door deployed as a ramp but the other door in both the closed position and opened as a door. When mounted on a cargo van, however, each door will generally only be closed, opened as a door or opened as a ramp at any one time. FIG. 2 illustrates one door closed and the other door both open as a door, in the left side of the figure, and deployed as a ramp in the right side of the figure. FIG. 3 is a representation of a user pushing a trolley up both doors deployed as ramps. FIG. 4 is again representational since it illustrates doors mounted both at a side of a cargo van and at the back of the cargo van both opened to act as doors and deployed together to act as a ramp. FIG. 5 is a side elevation view of a representational door mounted in a frame, as further described below. FIGS. 6 to 8 and 10 are again representational since they illustrate notional doors mounted in a frame. They are not intended to represent doors as they would actually appear in a cargo van. Similarly, FIG. 9 illustrates a representational frame with doors mounted in a structure to represent a cargo compartment. This is not intended to represent a dual acting door and ramp system as it would actually appear in a cargo van but is provided for simplicity of description.

A cargo van 1 comprises a cargo compartment 3 which has a roof 5, a floor 7, outward facing side walls 9, 11 and 13, and an opening 15 in one of the outward facing side walls. At least one door 17, which may also function as a ramp, is mounted in the opening 15. The door 17 has an exterior facing side 19, an interior facing side 21, a first lateral side 23, a second lateral side 25, an upward facing side 27, and a downward facing side 29. The positions are defined directionally when the door 17 is closed.

The door 17 may be mounted directly to the cargo compartment 3 or, alternatively, may be mounted to a frame 51 which is in turn mounted to the cargo compartment 3, as further explained below. In either case, first pivoting means 31 permit the at least one door 17 releasably to pivot laterally and perpendicularly in relation to one of the outward facing side walls 9, 11, 13 to act as a door. In addition, second pivoting means 33 permit the at least one door 17 releasably to pivot perpendicularly in relation to the floor 5 to act as a ramp.

The at least one door may comprise a single door or two doors mounted side by side. The door or doors may be mounted in any of the outward facing side walls 9, 11, 13.

In a first embodiment, at least one first releasable hinge 32 is mounted between the first lateral side 23 of the at least one door 17 and adjacent one of the outward facing side walls 9, 11, 13 of the cargo compartment 3. This first releasable hinge 32 is adapted to permit the door 17 to swing open horizontally sideways. In addition, at least one second releasable hinge 34 is mounted between the downward facing side 29 of the at least one door 17 and adjacent the floor 7 of the cargo compartment 3. The second releasable hinge 34 is adapted to permit the door 17 to swing up and down vertically in order to act as a ramp. When the first releasable hinge 32 is engaged to permit the at least one door 17 to swing laterally and perpendicularly in relation to one of the outward facing side walls 9, 11, 13 of the cargo compartment 3 to continue to function as a door, the second releasable hinge 34 is disengaged. Conversely, when the second releasable hinge 34 is engaged to permit the at least one door 17 to swing perpendicularly in relation to the floor 7 of the cargo compartment 3 to act as a ramp, the first releasable hinge 32 is disengaged. Means to coordinate engagement and disengagement of the first and second releasable hinges are provided. Suitable latches 39 may be used to release the first releasable hinge 32 and the second releasable hinge 34. Generally, when a latch 39 releases the first releasable hinge 32, the second releasable hinge 34 will remain engaged, and when a latch 39 releases the second releasable hinge 34, the first releasable hinge 32 will remain engaged. The latches 39 may be controlled automatically or manually.

When the door 17 is opened and closed vertically to act as a ramp, control means 37 to control its motion may be provided. For example, a cable 71 may extend from one of the outward facing walls 9, 11, 13 of the cargo compartment 3 adjacent the opening 15 to a lateral side 23 of the door to provide support or to roll and unroll under control of an active motive control, such as an electric motor 77. Alternatively, a passive motion controller, including an energy storage means such as a coil spring 73, gas strut assist mechanism 75, etc., may be employed to lower the door 17 open under control to act as a ramp and to reduce the physical effort required to return the door 17 to a closed position. A gas strut used for a similar purpose is described in U.S. Pat. No. 6,773,047 entitled Lift Assist Mechanism for Vehicle Tailgates. The structure is somewhat simpler in the door/ramp environment described herein since the gas strut may act on a simple lever arm to generate a closing moment and may remain fixed rather than being permitted to translate as in the tailgate environment.

Depending upon the requirements, the door 17 may be mounted at the rear of the cargo compartment in outward facing wall 9, or on either or both of outward facing side walls 11, 13. Increasing the number of door openings 3 will increase the manufacturing costs of the vehicle, but will provide greater flexibility for loading and unloading cargo.

For operation as a ramp, the door 17 is preferably provided with a ramp flap 43. The ramp flap 43 may be hinged to the upward facing side 27 of the at least one door 17 and rest against the interior facing side 21 of the at least one door when the door 17 is oriented vertically. As the door 17 rotates vertically to act as a ramp, the ramp flap 43 rotates outwardly to provide an extension to the ramp distal from the cargo compartment 3. Suitable supports 44 may be mounted to the exterior of the door or doors 17 adjacent their upward facing sides 27 to reduce wear on the doors 17 when they are lowered to act as ramps. Such supports 44 may prevent direct contact of the door 17 with the ground or other surface to protect the paint finish and general integrity of the door 17. The ramp flap 43 may be made of a material resistant to wear, such as a durable plastic, although metal may be used. In any event, since the ramp flap 43 is preferably stowed on the interior of the door 17 when not in use, wear of the ramp flap 43 will not generally be apparent except when the ramp flap 43 is deployed.

When two doors 17 are mounted side by side, they may be opened together or individually when acting both as doors and as ramps. The doors 17 may be conventionally latched together with latch mechanism 38 at a center-line of the opening 15. Accordingly, one door 17 may remain closed as the other is opened horizontally, or both doors 17 may swing open to increase access to the cargo compartment 3. Similarly, one door 17 may remain closed as the other is lowered to act as a ramp, or both doors 17 may be lowered to act as ramps, again to increase access to the cargo compartment. The releasable hinges, along with latches holding the hinges in place or releasing them, serve to permit this multiplicity of door orientations.

In a second embodiment, the door or doors 17 are not connected directly to the cargo compartment. Instead, the door or doors 17 are mounted in a frame 51 which, in turn, is pivotably mounted to the cargo compartment 3. This construction is shown schematically in FIGS. 5 to 10. For convenience, a two door construction is described. The frame 51 comprises two parts, namely mirror-image L-brackets 53, 55 with vertical arms 57, 59 and horizontal bases 61, 63. The bases 61, 63 of these L-brackets 53, 55 are releasably connected to each other at a position central of the opening. The releasable connection allows the L-brackets 53, 55 to rotate together or separately in relation to the floor 7 of the cargo compartment 3; this allows the doors 17 to be deployed as a ramp either together or separately. When only one door 17 is deployed as a ramp, the L-bracket 53, 55 of that door 17 rotates in relation to the floor 7 while the other L-bracket 53, 55 and its door 17 remain stationary and closed.

When functioning as a door or doors, the doors 17 may remain fixed within the frame 51 and the frame 51 may rotate in relation to the cargo compartment 3. Alternatively, the doors 17 may each be hinged to one of vertical arms 57, 59 of the frame 51, the doors 17 may rotate horizontally in relation to the frame 51, and the frame 51 may be releasably mounted to the cargo compartment 3. A latch 39 may be triggered to release the frame 51 to permit it to rotate vertically when the door 17 is to act as a ramp.

It should be understood that although particular component arrangements are disclosed in the illustrated embodiments, other arrangements will benefit herefrom. Although particular step sequences may be shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that reason, the following claims should be studied to determine their true scope and content.

The invention claimed is:

1. A cargo van door and ramp system comprising:
a frame adapted to be mounted in an opening in at least one of three outward facing side walls of a cargo van cargo compartment;
the frame comprising at least a horizontal base and two upright side arms extending from distal ends of the base;
two door-ramp components mounted side by side to the frame, the door-ramp components adapted to function as either doors or ramps;
the door-ramp components releasably attached to each other at an inner edge of each door-ramp component;
the horizontal base and two upright side arms comprising two L-brackets releasably connected to each other adjacent a floor of the cargo van cargo compartment and centrally of the opening which, when connected, permit the door-ramp components either to rotate horizontally to act as a door or to permit the door-ramp components to open and close together as a ramp, and when disconnected, to permit either door-ramp component to rotate vertically to act individually as a ramp;
the door-ramp components and the frame are releasably latched to at least one of the three outward facing side walls of the opening adjacent an outer edge of each door-ramp component and held in place in a closed position by latches, at least one of said latches engages each door-ramp component adjacent the outer edge of the respective door-ramp component and at least one other of said latches engages each door-ramp component adjacent a bottom edge of the respective door-ramp component;
each door-ramp component hinged adjacent one of the upright side arms to the at least one of the three outward facing side walls of the opening by first hinges and adapted to swing open and closed horizontally to act as a door when the respective at least one other of said latches is released;
each door-ramp component hinged adjacent the horizontal base by second hinges and adapted to swing open and closed vertically to act as a ramp when the respective at least one of said latches is released; and
means to engage and disengage the first hinges and the second hinges.

2. The cargo van door and ramp system of claim 1, wherein the cargo van cargo compartment further comprises a roof and a floor.

3. The cargo van door and ramp system of claim 2, wherein at least one releasable hinge is mounted between the bottom edge of each door-ramp component and adjacent the floor of the cargo compartment.

4. The cargo van door and ramp system of either of claims 1 and 2, wherein when each door-ramp component acts as a ramp, the motion of the ramp is controlled by one of a coil spring, a strut assist mechanism and an electric motor.

5. The cargo van door and ramp system of claim 4, wherein a cable is connected between the outer edge of at least one door-ramp component and one of the coil spring, the strut mechanism and the electric motor.

6. The cargo van door and ramp system of either of claims 1 and 2, wherein multiple releasable hinges are mounted between the at least one of the three outward facing side walls of the opening and each of the door-ramp components.

7. The cargo van door and ramp system of either of claims 1 and 2, wherein the at least one of said latches is adapted to release both the two upright side arms of the frame and each door-ramp component from the opening to rotate to act as a ramp.

8. The cargo van door and ramp system of either of claims 1 and 2, wherein the at least one other of said latches is adapted to release both the horizontal base of the frame and each door-ramp component from the opening to rotate to act as a door.

9. The cargo van door and ramp system of either of claims 1 and 2, wherein at least one releasable hinge is mounted between an outer edge of each door-ramp component and adjacent one of the outward facing side walls of the cargo compartment.

10. The cargo van door and ramp system of either of claims 1 and 2, wherein each door-ramp component further comprises a ramp flap hinged to an upper edge of the door-ramp component which rests against an interior facing side of the door-ramp component when the door-ramp component is oriented vertically, and which rotates outwardly to provide an extension to the door-ramp component when acting as a ramp.

11. The cargo van door and ramp system of either of claims 1 and 2, wherein the frame is mounted in at least one of the three outward facing side walls at a rear of the cargo compartment.

12. The cargo van door and ramp system of either of claims 1 and 2, wherein the frame is mounted in at least one of the three outward facing side walls at a lateral side of the cargo compartment.

13. The cargo van door and ramp system of either of claims 1 and 2, wherein the opening is at least partially defined by rear vehicle body pillars of the cargo van.

14. The cargo van door and ramp system of either of claims 1 and 2, wherein the first hinges are combined with first hinge latch components and the second hinges are combined with second hinge latch components.

* * * * *